(12) United States Patent
Jung et al.

(10) Patent No.: US 11,760,572 B2
(45) Date of Patent: Sep. 19, 2023

(54) APPARATUS FOR CONVEYING PRODUCT AND OPERATING METHOD THEREOF

(71) Applicant: Coupang Corp., Seoul (KR)

(72) Inventors: Hyun Yop Jung, Seoul (KR); Kyung Tae Kang, Seoul (KR); Dae Yong Jang, Seoul (KR); Da Young Kim, Seoul (KR); Jeong Seok Oh, Seoul (KR)

(73) Assignee: Coupang Corp., Seoul (KR)

(*) Notice: Subject to any disclaimer, the term of this patent is extended or adjusted under 35 U.S.C. 154(b) by 144 days.

(21) Appl. No.: 17/383,309

(22) Filed: Jul. 22, 2021

(65) Prior Publication Data

US 2021/0347570 A1 Nov. 11, 2021

Related U.S. Application Data

(63) Continuation of application No. 17/022,624, filed on Sep. 16, 2020, now Pat. No. 11,097,898.

(30) Foreign Application Priority Data

Feb. 17, 2020 (KR) .................. 10-2020-0019036

(51) Int. Cl.
*G06F 7/00* (2006.01)
*B65G 1/137* (2006.01)

(52) U.S. Cl.
CPC .... *B65G 1/1373* (2013.01); *B65G 2203/0216* (2013.01)

(58) Field of Classification Search
CPC .......... B65G 1/1373; B65G 2203/0216; G06Q 10/06312; G06Q 10/06316; G06Q 10/083; G06Q 10/06315; G06Q 10/087; G06Q 10/10
USPC ................................. 700/213–214, 216, 218
See application file for complete search history.

(56) References Cited

U.S. PATENT DOCUMENTS

| 9,174,343 | B2 | 11/2015 | Tomioka et al. |
| 11,195,143 | B1* | 12/2021 | Sikka .................. G06Q 10/087 |
| 11,574,279 | B2* | 2/2023 | Hanks .................. G06Q 10/083 |
| 2016/0063519 | A1 | 3/2016 | Bao |

(Continued)

FOREIGN PATENT DOCUMENTS

| CN | 102431758 A | 5/2012 |
| CN | 108712946 A | 10/2018 |

(Continued)

*Primary Examiner* — Yolanda R Cumbess
(74) *Attorney, Agent, or Firm* — Knobbe, Martens, Olson & Bear LLP

(57) ABSTRACT

Provided are an electronic apparatus for transporting an item and an operation method thereof. The operation method includes identifying characteristic information of the item, identifying whether the identified characteristic information comprises main characteristic information associated with planned placement, based on a result of whether the identified characteristic information comprises the main characteristic information, identifying a placement space corresponding to the main characteristic information among a plurality of placement spaces or identifying one placement space among the plurality of placement spaces, and controlling a transport device to transport the item to a location corresponding to the identified placement space.

15 Claims, 15 Drawing Sheets

(56) References Cited

U.S. PATENT DOCUMENTS

| | | |
|---|---|---|
| 2016/0145045 A1 | 5/2016 | Mountz |
| 2018/0021439 A1 | 1/2018 | McGiven |
| 2018/0201445 A1 | 7/2018 | Battles et al. |

FOREIGN PATENT DOCUMENTS

| | | |
|---|---|---|
| CN | 109071114 A | 12/2018 |
| EP | 2500850 | 9/2012 |
| EP | 3053857 A1 | 8/2016 |
| JP | H05-186005 A | 7/1993 |
| JP | 2000-351417 A | 12/2000 |
| JP | 2002-157315 A | 5/2002 |
| JP | 2003-201003 A | 7/2003 |
| JP | 2004-030407 A | 1/2004 |
| JP | 2004-315101 A | 11/2004 |
| JP | 2006-225089 A | 8/2006 |
| JP | 2008-303062 A | 12/2008 |
| JP | 2009-205365 A | 9/2009 |
| JP | 2016-048409 A | 4/2016 |
| JP | 2017-057028 A | 3/2017 |
| JP | 2017-165502 A | 9/2017 |
| JP | 2019-099338 A | 6/2019 |
| JP | 2020-128267 A | 8/2020 |
| KR | 10-2015-0050769 A | 5/2015 |
| KR | 10-2016-0044320 A | 4/2016 |
| KR | 10-1778758 B1 | 9/2017 |
| KR | 10-1983018 B1 | 5/2019 |
| KR | 10-2009131 B1 | 8/2019 |
| KR | 10-2019-0141420 A | 12/2019 |
| WO | WO2010-023795 A1 | 3/2010 |
| WO | WO 2015/045182 A1 | 4/2015 |

\* cited by examiner

FIG. 8

| DEO 1 ▾ | Home  Receipt  Transfer  Location  Stock transfer  Stock management |
|---|---|
| Stock management | Stock management > Prime SKU management |

Item management
Stock search
Stowing setting
Individual stock tracking
Prime SKU management External SKU ID [　　　]  Item name [　　　]  Characteristic
External SKU ID [　　　]  Item name [　　　]  All ⌄  [🔍 Search]

Upload : [Select file] No file selected  [Upload] [Download SingulationPrimeSKU registration form] [Download all SingulationPrimeSKUs]

| External SKU ID | Item name | Characteristic | | Created date | Creator | Cancel |
|---|---|---|---|---|---|---|
| 10440579 | Item A | HighRisk ⌄ | Store | 2020-01-15 14:37:21 | 21730880 | Cancel |
| 11102918 | Item B | HighRisk ⌄ | Store | 2020-01-15 08:31:55 | 21730880 | Cancel |
| 11093257 | Item C | HighRisk ⌄ | Store | 2020-01-15 08:31:55 | 21730880 | Cancel |

810

820

Hide «

FIG. 9

| DEO 1 ▽ | Home | Receipt | Transfer | Location | Stock transfer | Stock management |
|---|---|---|---|---|---|---|

Location

Virtual location
Modify location
Empty type
Empty location
Placement space management Location > Placement space management

| All placement spaces | Temperature type | Characteristic |
|---|---|---|
| All placement spaces ▽ | Temperature type ▽ | Characteristic ▽ |

Q Search

| Placement space name | Temperature setting | Temperature setting change | Characteristic | Characteristic setting | Created date | Modified date | Modifier |
|---|---|---|---|---|---|---|---|
| 30Z | Room temperature | Room temperature ▽ Store | General | General ▽ Store | 2019/12/25 10:04:05 | 2019/12/25 19:09:41 | 93670715 |
| 21Z | Room temperature | Room temperature ▽ Store | Highrisk | Highrisk ▽ Store | 2019/12/25 10:04:05 | 2019/12/25 12:10:58 | 30569788 |
| 11Z | Room temperature | Room temperature ▽ Store | Prime 1 | Prime 1 ▽ Store | 2019/12/25 10:04:04 | 2019/12/25 10:41:07 | 88835285 |

Hide «

FIG. 10

DEO 1 ▽    Home   Receipt   Transfer   Location   Stock transfer   Stock management

Receipt
Order history
Receiving work table
Conveyor setting
Receipt setting

Receipt > Receipt setting

⊙ Individual   ⊙ Pallet   ⊙ Conveyor destination setting

1010 — + Add new receipt filter
○ Including not used ones

| Priority | Status | Receipt filter name | Placement space type | Subject item | Transport device |
|---|---|---|---|---|---|
| 1 | Used | Prime sku | BUFFER/PICKING | Item class : S, A, B, C, N [AND] Prime SKU = PRIME_1 | S2641(1) |
| 10 | Used | #3 BCN Picking(4 Floor) | BUFFER/PICKING | Item class : B, N, C [AND] Volume <= 4500000mm³ | S4642(1) |
| 20 | Used | #1 SA Picking(2 Floor) | BUFFER/PICKING | SKU class : S, A | S2642(1) |
| 30 | Used | #2 BCN Picking(3 Floor) | BUFFER/PICKING | Item class : B, C, N [AND] Volume <= 4500000mm³ | S3442(1) |

Hide <<

FIG. 11

Basic information of receipt filter (1110)

| | |
|---|---|
| Type | EACH |
| Filter name | |
| Placement space type | BUFFER/PICKING |
| Priority | Priority(1~99) |
| Whether used | ⊙ Yes ○ No |

Fields to be applied to receipt filter (1120)

| Filter type | Method to be applied | Target to be applied | | Whether used |
|---|---|---|---|---|
| Item class | | □S □A □B □C □N | | Not used |
| Item temperature | | | | Not used |
| Volume | | | mm³ | Not used |
| Weight | | | g | Not used |
| Length of one side | | | mm | Not used |
| Length of all sides | | | mm | Not used |
| Problem handling | | | | Not used |
| Prime SKU | | P1(PRIME_1)<br>P2(PRIME_2)<br>P3(PRIME_3)<br>P4(PRIME_4)<br>P5(PRIME_5)<br>H(HIGH_RISK) | | Used |

FIG. 13

Incheon4(INC4)     Unloading ⊙     ⇥ Logout

Unloading > Delivery     ⊙ Change unloading type

Scan barcode

Tracking No.   12345678901234567890   Scan reservation No.   Order No.   12345678901234567890

Tracking No.: 98717368192059l827

Order No.: Urgent 987654321 ×   Same day 987654321 ×   Reservation No.

Unloading date: 2019.07.03   11:31:11 am     ✓Total ✓By urgency of order No. ✓By SKU priority

| Order No. | SKU priority | Whether repacked | Item name | SKU type | SKU ID | Whether SKU measured |
|---|---|---|---|---|---|---|
| Urgent 987654321 | ASAP In a day | Repacked P̂ | Moisturizing cream | Pallet Cooling at -10° | 987654321 | Not measured |
| Urgent 987654321 | ASAP | Repacked | Pencil sharpener + Pencil, One set | Rainbow | 987654321 | Not measured |
| Same day 987654321 | ASAP | | Stick Chocolate | Loose | 987654321 | |
| Same day 987654321 | | Repacked | Pasteurized milk | Rainbow | 987654321 | Not measured |

1310

Reset     Unloading complete

APPARATUS FOR CONVEYING PRODUCT AND OPERATING METHOD THEREOF

CROSS-REFERENCE TO RELATED APPLICATIONS

This application is a continuation of U.S. patent application Ser. No. 17/022,624, filed on Sep. 16, 2020, which claims priority to Korean Application No. 10-2020-0019036, filed Feb. 17, 2020, each of which is incorporated herein by reference in its entirety.

BACKGROUND

Technical Field

The present disclosure relates to an electronic apparatus for transporting an item based on characteristic information of the item, and an operation method thereof.

Background Art

Fulfillment centers are facilities where items are stored for a short period or a long period for rapid delivery. As ecommerce business has been actively growing, the fulfillment centers are more needed, and there are increasing demands for developing a method for utilizing fulfillment centers more effectively.

In an effort to meet the demands, a random stow-based item placing method has been recently introduced to fulfillment centers. The random stow is a method for placement, by which units of the same item are randomly scattered and placed at various locations. If items are placed by the random stow method, an item placed at a more suitable location may be picked in consideration of a worker's movement when shipping or transporting the items, thereby maximizing work efficiency in a fulfillment center.

Meanwhile, there may be an item that requires special management depending on a situation. However, in a fulfillment center where a random stow-based item placing method is introduced, management efficiency may be deteriorated because items are randomly scattered and placed over the fulfillment center. Therefore, a method for managing an item more effectively while taking into consideration work efficiency is required.

SUMMARY

Technical Goals

An aspect provides an electronic apparatus for determining, based on characteristic information of an item, a placement space to which the item is to be placed for efficiency work and effective item management, and an operation method thereof. Technical goals to be achieved through the example embodiments are not limited to the technical goals as described above, and other technical tasks can be inferred from the following example embodiments.

Technical Solutions

According to a first embodiment, there is provided an operation method of an electronic apparatus for transporting an item, the method including identifying characteristic information of the item, identifying whether the identified characteristic information comprises main characteristic information associated with planned placement, based on a result of whether the identified characteristic information comprises the main characteristic information, identifying a placement space corresponding to the main characteristic information among a plurality of placement spaces or identifying one placement space among the plurality of placement spaces, and controlling a transport device to transport the item to a location corresponding to the identified placement space.

According to a second embodiment, there is provided an electronic apparatus for transporting an item including a memory configured to store at least one instruction, and a processor configured to execute the at least one instruction, identify characteristic information of an item, identify whether the identified characteristic information comprises main characteristic information associated with planned placement, based on a result of whether the identified characteristic information comprises the main characteristic information, identify a placement space corresponding to the main characteristic information among a plurality of placement spaces or identify one placement space among the plurality of placement spaces, and control the transport device to transport the item to a location corresponding to the identified placement space.

According to a third embodiment, there is provided a non-transitory computer-readable program having stored thereon a program, which, when executed by a computer, an operation method of an electronic apparatus for transporting an item, and the operation method includes identifying characteristic information of the item, identifying whether the identified characteristic information comprises main characteristic information associated with planned placement, based on a result of whether the identified characteristic information comprises the main characteristic information, identifying a placement space corresponding to the main characteristic information among a plurality of placement spaces or identifying one placement space among the plurality of placement spaces, and controlling the transport device to transport the item to a location corresponding to the identified placement space.

Details of other embodiments are included in the detailed description and drawings.

Effects

According to the present disclosure, the electronic apparatus for transporting an item and the operation method thereof may confirm, based on characteristic information of an item, a placement space to which the item is to be placed, thereby improving operation efficiency and enabling item management more effectively. For example, the electronic apparatus for transporting an item and the operation method thereof may allow an item having first characteristic information to be transported to a placement space matched to the first characteristic information and an item having second characteristic information to be randomly placed, thereby improving operation efficiency and enabling item management more effectively.

In addition, when there is a plurality of placement spaces corresponding to characteristic information of an item, the electronic apparatus for transporting an item and the operation method thereof may determine, based on characteristics to the placement spaces, a placement space where an item is to be transported, thereby enabling item management to be performed more effectively. For example, when a placement space corresponding to characteristic information of an item includes a first placement space and a second placement space, the electronic apparatus for transporting an item and the operation method thereof may allow the item to be placed in a placement space having a larger number of workers, thereby enabling item management more efficiently.

Effects of the present disclosure are not limited to the effects mentioned above, and other effects not mentioned will become apparent to those skilled in the art from the description of the claims.

BRIEF DESCRIPTION OF DRAWINGS

FIG. 8 is a diagram illustrating a user interface (UI) of an electronic apparatus for setting characteristic information of an item according to an embodiment.

FIG. 9 is a diagram illustrating a UI of an electronic apparatus for setting a placement space according to an embodiment.

FIGS. 10 and 11 are diagrams illustrating UIs provided by an electronic apparatus to set the receipt filter according to an embodiment.

FIGS. 12 and 13 are diagrams illustrating UIs provided by an electronic apparatus in response to recognition of an item, according to an embodiment.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
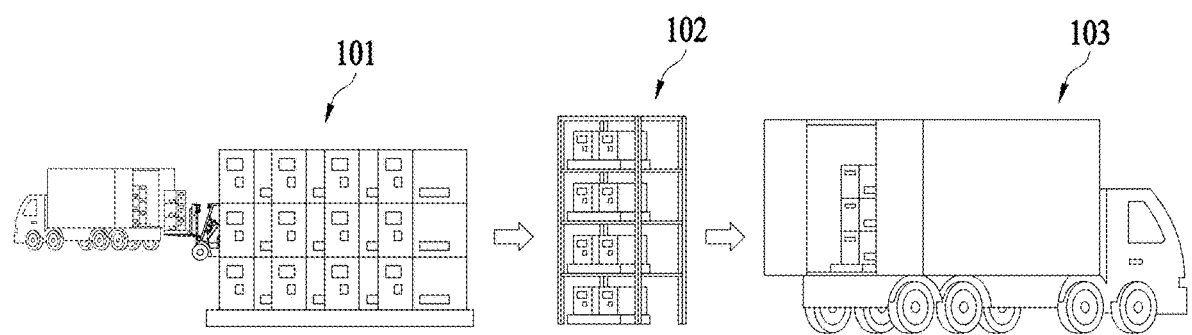
FIG. 1 is a conceptual diagram of a distribution process in a fulfillment center.

FIG. 1 is a conceptual diagram of a distribution process of a fulfillment center.

Referring to FIG. 1, the distribution process of the fulfillment center may include a receiving step 101, a placing step 102, and a shipping step 101. The receiving step 101 may include a step in which an item to be placed in the fulfillment center arrives at the fulfillment center. The placing step 102 may include a step in which an item is transported to a placement space within the fulfillment center and then placed therein. The shipping step 101 may include a step in which an item to be shipped is taken out of the fulfillment center for delivery.

An electronic apparatus for transporting an item and an operation method thereof according to an embodiment of the present disclosure may be associated with a process from the receiving step 101 to the placing step 102. More specifically, the electronic apparatus for transporting an item and an operation method thereof according to an embodiment of the present disclosure are associated with a process from a step of receiving an item to be placed in a placement space in the fulfillment center to a step of transporting the item to the placement space.

Meanwhile, the distribution process shown in FIG. 1 is merely a concept for describing the present disclosure, and according to an aspect of the distribution process, each step (for example, the receiving step 101, the placing step 102, and the shipping step 103) may be referred to as different terms or an additional step may be added before or after at least one of the aforementioned stages.

In addition, the term "fulfillment center" used in the present disclosure refers to a particular space including a transport device (e.g., a conveyor belt, a forklift, and a robot) controlled by the electronic apparatus according to the present disclosure as well as a placement space where an item is to be placed, but embodiments according to the present disclosure are not limited to the aforementioned term.

Figure 2:
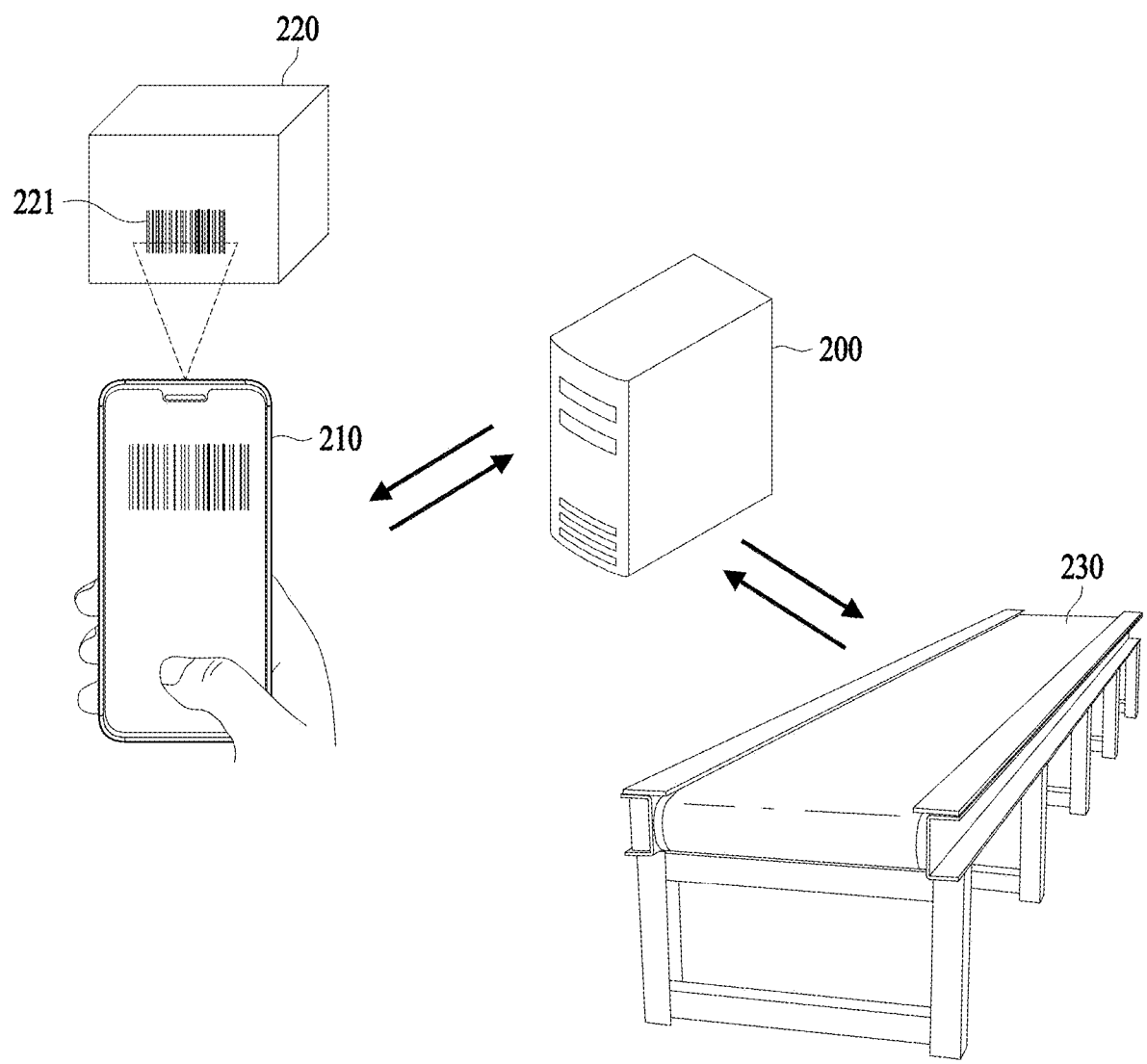
FIG. 2 is a diagram illustrating a relationship between an electronic apparatus and other electronic apparatuses according to an embodiment.

FIG. 2 is a diagram illustrating a relationship between an electronic apparatus and other electronic apparatuses according to an embodiment. Specifically, FIG. 2 conceptually illustrates a relationship between an electronic apparatus 200, a user terminal 210, and a transport device 230.

Referring to FIG. 2, the electronic apparatus 200 may be implemented in the form of a server and connected to each of the user terminal 210 and the transport device 230. The user terminal 210 is a terminal carried by a worker in the fulfillment center, and may include an electronic apparatus having a function to scan a barcode 221. Here, the barcode 221 is affixed to at least a portion of an item 220 received in the fulfillment center.

The user terminal 210 may scan the barcode 221 as shown in the drawing. For example, the user terminal 210 may include a camera or sensor, and the user terminal 210 may scan the barcode 221 based on a position of the camera or sensor of the user terminal 210 facing the barcode 221.

The barcode 221 may include basic information of the item 220. The basic information of the item 220 may include, for example, but not limited to, at least one of an item name, an item type, and a serial number assigned to the item 220. Since recognizing information with the barcode 221 is apparent to a person skilled in the art, a detailed description thereof will be omitted.

In response to the scanning of the barcode 2210, the user terminal 210 may acquire the basic information of the item 220 and transmit the acquired basic information of the item 220 to the electronic apparatus 200.

The electronic apparatus 200 may identify characteristic information of the item 220 based on the basic information of the item 220. Specifically, upon receiving the basic information of the item 220, the electronic apparatus may identify the characteristic information corresponding to the item 220.

The characteristic information of the item 220 is information preset relevant to the item 220 and may include, for example, main characteristic information (or first characteristic information) requiring planned placement or general characteristic information (or second characteristic information) requiring random placement. In addition, the characteristic information may be pre-stored in the electronic apparatus 200. Here, the planned placement may refer to a type of placement by which a particular item is placed at a particular location based on a fixed stow method. The random placement may refer to a type of placement by which an item is randomly placed at an arbitrary location based on a random stow method.

Specifically, the main characteristic information may be information representing a characteristic which requires an item to be placed in a placement space matched to the main characteristic information. The general characteristic information may be information representing a characteristic which requires an item to be placed in one placement space randomly determined from among a plurality of placement spaces.

The main characteristic information may include, for example, information associated with at least one of a sales rate, a risk of damage, a price, a theft rate, and a loss rate. For example, the characteristic information of the item 220 may include first main characteristic information that indicates a damage rate equal to or greater than a particular value and thus there is a risk of damage. In another example, the characteristic information of the item 220 may include second main characteristic information that indicates a price equal to or greater than a particular value and thus special management is required.

The characteristic information of the item 220 is information preset relevant to the item 220 and may be stored in the electronic apparatus 200. In an embodiment, the characteristic information may be preset for a type of the item 220 based on a user's input, and the related embodiment may refer to FIG. 8.

In response to identifying the characteristic information of the item, the electronic apparatus 200 may provide the characteristic information of the item 220 to the user terminal 210. In response to receiving the characteristic information of the item 220, the user terminal 210 may display characteristic information of the item 220.

In some cases, the electronic apparatus 200 may include a separate displaying device, for example, a display, in which case the characteristic information of the item 220 may be displayed through the displaying device. Meanwhile, FIGS. 12 to 15 may be referred to for examples associated with a UI that can be displayed through the user terminal 210 or the displaying device.

When the characteristic information of the item 220 is identified, the electronic apparatus 200 may identify whether the identified characteristic information includes the main characteristic information. When the identified characteristic information includes the main characteristic information, the electronic apparatus 200 may control the transport device 230 so that the item 220 is transported to a placement space that is matched to the main characteristic information through the transport device 230.

Here, at least some of the plurality of placement spaces may be previously matched to the main characteristic information. For example, a first placement space among the plurality of placement spaces may be matched to the first main characteristic information, and a second placement space among the plurality of placement spaces may be matched to the second main characteristic information. FIG. 9 may be referred to for a more specific related embodiment.

In an embodiment, the electronic apparatus 200 may identify whether the identified characteristic information includes the general characteristic information. When the identified characteristic information includes the general characteristic information, the electronic apparatus 200 may randomly select one of the plurality of placement spaces and control the transport device 230 to transport the item to the selected placement space.

In some cases, a destination for each placement space may be included (or preset). The destination may include a specific point located adjacent to the placement space to place the item in the placement space within the fulfillment center. In this case, the electronic apparatus 200 may control the transport device 230 so that the item 220 is transported to the destination corresponding to the selected placement space.

Meanwhile, controlling the transport device 230 may be performed on the basis of transmission and reception of a control signal with the electronic apparatus 200, which is apparent to one of ordinary skill in the art and thus a detailed description is herein omitted. In addition, the transport device 230 is depicted as, but not limited to, a conveyor belt in FIG. 2, and may be implemented as various types of device (e.g., a robot and a forklift) capable of transporting an item based on transmission and reception of a control signal.

Further, in some cases, the transport device 230 may be included in the electronic apparatus 200, but the present embodiment is not limited thereto.

In the embodiment, in response to identifying a placement space to which the item 220 is to be transported, the electronic apparatus 200 may provide the user terminal 210 with information on or regarding the identified placement space. In this case, the user terminal 210 may display the information on the identified placement space in which the item 220 is to be placed.

Figure 3:
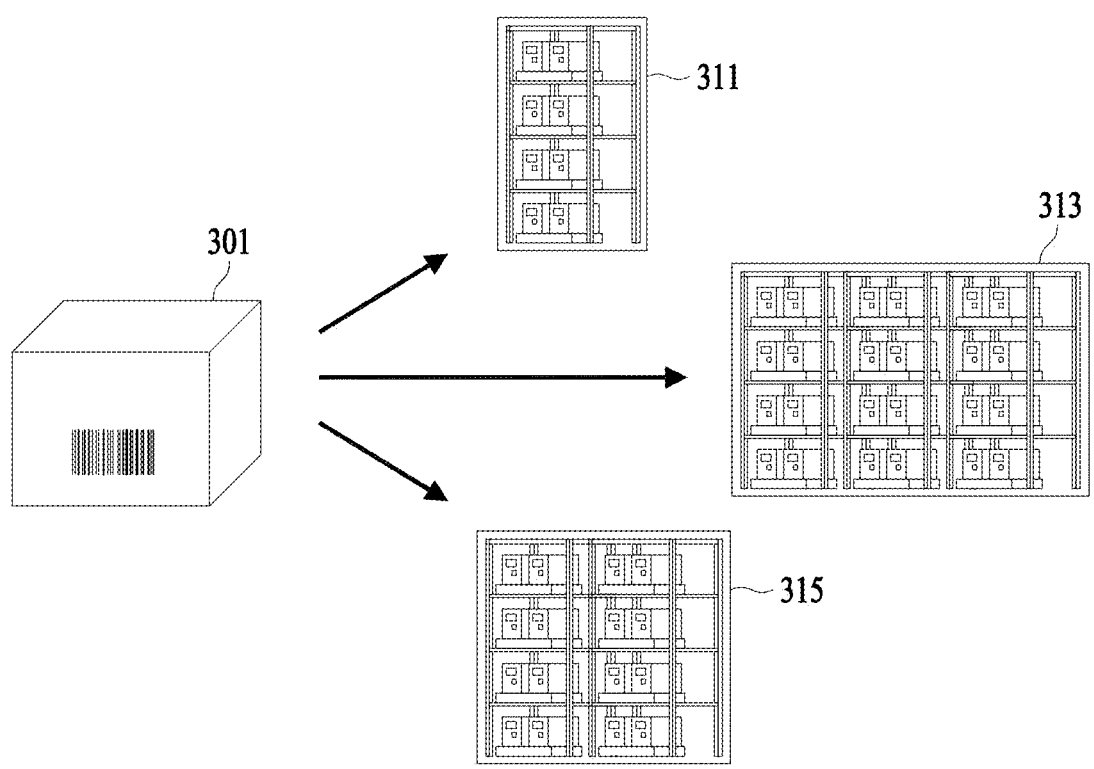
FIG. 3 is a conceptual diagram illustrating item transportation performed using an electronic apparatus according to an embodiment.

FIG. 3 is a conceptual diagram illustrating item transportation performed using an electronic apparatus according to an embodiment. Specifically, FIG. 3 is a diagram illustrating an example in which an item is transported to one of a plurality of placement spaces (e.g., a first placement space 311, a second placement space 313, and a third placement space 315).

Referring to FIG. 3, an item 301 may be transported to one of the plurality of placement spaces. Specifically, the item 301 may be transported to one of the plurality of placement spaces based on characteristic information of the item 301.

The item 301 may be transported to a placement space identified by an electronic apparatus (e.g., the electronic apparatus 220 of FIG. 2) based on identification of the item 301 by a transport device (e.g., the transport device 230 of FIG. 2). Although not illustrated, a destination spot to which the item 301 is transported may be preset for each placement space, in which case the item 301 may be transported to the destination spot in a placement space identified by the transport device.

For example, the item 301 may be preset to have first main characteristic information. The first main characteristic information may include, for example, information representing a high popularity characteristic that indicates a sales rate equal to or greater than a particular value. In this case, the electronic apparatus may identify a placement space associated with the first main characteristic information among the plurality of placement spaces. Here, the placement space associated with the first main characteristic information may include a placement space in which an item corresponding to the first main characteristic information is preset to be placed.

In an embodiment, the first placement space 311 may be preset to be associated with the first main characteristic information, and information on the presetting may be pre-stored in the electronic apparatus. Accordingly, when it is identified that the item 301 has the first main characteristic information, the electronic apparatus may identify the first placement space 311 associated with the first main characteristic information as a placement space to which the item 301 is to be transported. The electronic apparatus may control the transport device so that the item 301 is transported to the first placement space 311.

According to an embodiment, the placement space associated with the first main characteristic information may be in plural number. For example, each of the first placement space 311 and the second placement space 313 may be associated with the first main characteristic information. In this case, the electronic apparatus may determine one of the first placement space 311 and the second placement space 313 as a placement space to which the item 301 is to be transported.

Specifically, the electronic apparatus may select one of the first placement space 311 and the second placement space 313 based on information on at least one of the following: an available volume of each of the first placement space 311 and the second placement space 313, a number of workers assigned to each of the first placement space 311 and the second placement space 313, and a number of types of items placed in each of the first placement space 311 and the second placement space 313.

For example, the electronic apparatus may select a placement space having a largest available volume from between the first placement space 311 and the second placement space 313 as a placement space to which the item 301 is to be transported. In another example, the electronic apparatus may select a placement space having a largest number of workers from between the first placement space 311 and the second placement space 313 as a placement space to which the item 301 is to be transported. In another example, the electronic apparatus may select a placement space with a smallest number of types of pre-placed items from between the first placement space 311 and the second placement space 313 as a placement space to which the item is to be transported.

Figure 4:
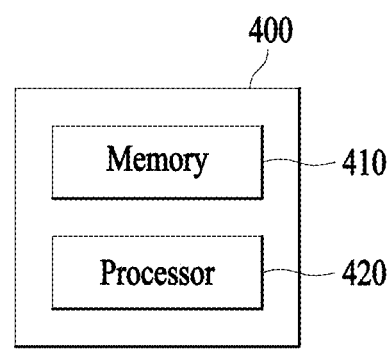
FIG. 4 is a block diagram of an electronic apparatus according to an embodiment.

FIG. 4 is a block diagram of an electronic apparatus according to an embodiment.

Referring to FIG. 4, an electronic apparatus 400 (e.g., the electronic apparatus 200 of FIG. 2) may include a memory 410 and a processor 420. According to an embodiment, each of the memory 410 and the processor 420 may refer to a unit of performing at least one function or operation and may be implemented by hardware or software, or a combination of hardware and software.

In addition, according to an embodiment, the electronic apparatus 400 may be implemented as a server. In this case, the electronic apparatus 400 may be connected to another electronic apparatus, for example, a user terminal, and may perform various operations by transmitting and receiving information to and from another electronic apparatus.

Meanwhile, FIG. 4 illustrates elements associated with the present disclosure. Accordingly, it would be understood by one of ordinary skill in the art that general-purpose elements other than the elements shown in FIG. 4 may be further included.

The memory 410 may store a variety of data associated with the electronic apparatus 400. For example, the memory 410 may store at least one instruction for operations of the processor 420 which is to be described later. However, the present disclosure is not limited thereto, and the memory may store, for example, data associated with a plurality of application programs (or applications) to be executed in the electronic apparatus 400.

The processor 420 may control overall operations of the electronic apparatus 400 and process data and signals associated with the electronic apparatus 400. The processor 420 may execute various operations described below by executing at least one instruction stored in the memory 410.

The processor 420 may identify characteristic information of an item. The characteristic information of the item may include, for example, main characteristic information associated with planned placement. The main characteristic information may include characteristic information indicating that a method for placing a particular item at a particular location is applied. In another example, the characteristic information of the item may include general characteristic information associated with random placement. The general characteristic information may include characteristic information indicating that a random stow-based placement method is applied.

The main characteristic information may include information representing a characteristic which requires an item to be placed at a particular location for management of the item. The main characteristic information may include, for example, information associated with at least one of a sales rate, a risk of damage, a price, a theft rate, and a loss rate. More specifically, the main characteristic information may include, for example, information on at least one of the following: a characteristic with a sales rate equal to or greater than a particular value, a characteristic with a risk of damage equal to or greater than a particular value, a characteristic with a price equal to or greater than a particular value, a characteristic with a theft rate equal to or greater than a particular value, and a characteristic with a loss rate equal to or greater than a particular value.

According to an embodiment, the main characteristic information may be classified by type, and each type of main characteristic information may be referred to as a separate term. For example, the characteristic with the sales rate equal to or greater than the particular value may be referred to as first main characteristic information or Prime 1, and the characteristic with the risk of damage equal to or greater than the particular value may be referred to as second main characteristic information or High Risk. However, the present disclosure is not limited to these terms. As will be described later, placement spaces preset relevant to main characteristic information may also be classified by types of the main characteristic information. For example, the first placement space may be preset to correspond to the first main characteristic information, and the second placement space may be preset to correspond to the second main characteristic information.

In an embodiment, in response to receiving an item in a fulfillment center, the processor 420 may identify characteristic information of the item. For example, when the receipt of the item is identified through a user terminal (e.g., the user terminal 210 of FIG. 2), characteristic information of the item may be identified in response to receiving basic information of the item from the user terminal.

More specifically, for example, when the processor 420 receives the basic information of the item from the user terminal, the processor 420 may identify the item indicated by the basic information and identify characteristic information preset to correspond to the identified item. Here, the basic information of the item may include, but not limited to, information on at least one of an item name, an item type, and a serial number assigned to the item, and may include various information indicating the item.

The processor 420 may identify whether the identified characteristic information includes main characteristic information. The processor 420 may identify whether the identified characteristic information corresponds to the main characteristic information. When the main characteristic information is subdivided by type, the processor 420 may identify a type of main characteristic information (e.g., first main characteristic information and second main characteristic information) corresponding to the identified characteristic information.

In an embodiment, the processor 420 may transmit the identified characteristic information to the user terminal in response to identifying the characteristic information of the item. In this case, the identified characteristic information may be displayed on the user terminal. In some cases, the electronic apparatus 400 may further include a display, in which case the processor 420 may perform a control to display the identified characteristic information on the display. Meanwhile, FIGS. 12 to 15 may be referred to for a more specific related embodiment.

Based on a result of whether the identified characteristic information includes the main characteristic information, the processor 420 may identify a placement space corresponding to the main characteristic information among a plurality of placement spaces or may identify one placement space among the plurality of placement spaces.

More specifically, when the identified characteristic information includes the main characteristic information, the processor 420 may identify a placement space corresponding to the main characteristic information among the plurality of placement spaces. When the identified characteristic information does not include the main characteristic information, the processor 420 may randomly identify one placement space among the plurality of placement spaces. That is, when the identified characteristic information does not include the main characteristic information, the processor 420 may randomly identify one of the plurality of placement spaces.

In some cases, the processor 420 may identify whether the identified characteristic information corresponds to the main characteristic information or general characteristic information. In this case, when the identified characteristic information includes the main characteristic information, the processor 420 may identify a placement space corresponding to the main characteristic information among the plurality of placement spaces, and when the identified characteristic information includes the general characteristic information, the processor 420 may randomly identify one placement space among the plurality of placement spaces.

In an embodiment, when the main characteristic information includes a characteristic with a sales rate equal to or greater than a particular value (hereinafter, referred to as the first main characteristic information), the processor 420 may identify (or determine) a placement space within a preset distance from a shipping location among the plurality of placement spaces as a placement space corresponding to the first main characteristic information.

At this time, information on or regarding a distance to the shipping location from each of the plurality of placement spaces may be stored in the memory 410 in advance, and the processor 420 may perform the first operation as described above based on the information stored in the memory 410. It is possible to identify the placement space corresponding to the main characteristic information. In this case, an item with a high sales rate may be shipped more quickly.

In an embodiment, when the main characteristic information includes a characteristic with a risk of damage equal to or greater than a particular value (hereinafter, referred to as second main characteristic information), the processor 420 may identify (or determine) a placement space within a preset distance from a receiving location or a shipping location among the plurality of placement spaces as a placement space corresponding to the second main characteristic information.

At this time, information on or regarding a distance to a receiving location or a shipping location from each of the plurality of placement spaces may be pre-stored in the memory 410, and based on the information stored in the memory 410, the processor 420 may identify a placement space corresponding to the second main characteristic information, as described above. In this case, a movement distance for receiving and shipping an item may be minimized, thereby reducing a risk of damage.

In an embodiment, when the main characteristic information includes a characteristic with a price equal to or greater than a particular value (hereinafter, referred to as third main characteristic information), a characteristic with a theft rate equal to or greater than a particular value (hereinafter, referred to as fourth main characteristic information), or a characteristic with a loss rate equal to or greater than a particular value (hereinafter, referred to as fifth main characteristic information), the processor 420 may identify a placement space corresponding to the third main characteristic information, the fourth main characteristic information, or the fifth main characteristic information among the plurality of placement spaces as a placement space within a preset distance from a preset location.

Here, the preset location may include, for example, but not limited to, a specific spot on a first floor, a specific spot determined by an administrator, or a specific spot within an area monitored by a security camera. Meanwhile, in this case, item management may be performed more efficiently, thereby reducing a risk of theft or a risk of loss.

In an embodiment, a placement space corresponding to main characteristic information may be preset based on a user input. For example, the first main characteristic information may be predetermined to correspond to first placement space. FIG. 9 may be referred to for a specific related example of a user input window.

The processor 420 may control a transport device so that an item is transported to a location corresponding to the identified placement space. In some cases, the processor 420 may control a transport device so that an item is transported to a destination corresponding to the identified placement space. In this case, the destination is a spot at which other items are already placed before the corresponding item is placed in the placement space, and a destination may be assigned for each placement space.

In an embodiment, a plurality of placement spaces may be identified. In this case, the processor 420 may select one placement space to which the item is to be transported from among a plurality of identified placement spaces. Specifically, if a plurality of placement spaces is identified, the processor 420 may select one placement space from among the plurality of identified placement spaces based on at least one of the following: an available volume of each of the plurality of identified placement spaces, a number of workers assigned to each of the plurality of identified placement spaces, and a number of types of items placed in each of the plurality of identified placement spaces.

For example, the processor 420 may identify information on or regarding the available volume of each of the plurality of identified placement spaces. An available volume may include an empty space that remains empty because no item has been placed. Information on or regarding an available volume may include information on or regarding a size of the available volume. The processor 420 may select a placement space having a largest available volume from among the plurality of identified placement spaces as a placement space to which the item is to be transported.

In another example, the processor 420 may identify information on or regarding the number of workers assigned to each of the plurality of identified placement spaces. The number of workers assigned to each of the plurality of identified placement spaces may be preset, and information on the number of workers assigned to each of the plurality of identified placement spaces may be stored in the memory 410. The processor 420 may identify the information on the number of workers assigned to each of the plurality of identified placement spaces. The processor 420 may select a placement space with a largest number of assigned workers from among the plurality of identified placement spaces as a placement space to which the item is to be transported.

In another example, the processor 420 may identify the number of types of items pre-placed in each of the plurality of identified placement spaces. The processor 420 may acquire information on or regarding the types of the items placed in each placement space, and the memory 410 may store the information on the types of the items placed in each placement space. The processor 420 may select a placement space with items of a smallest number of types among the identified placement spaces as a placement space where an item is to be transported.

In an embodiment, the processor 420 may receive, from the user terminal, information on or regarding at least one of the following: an available volume of each of the plurality of identified placement spaces, a number of workers assigned to each of the plurality of identified placement spaces, and a number of types of items placed in each of the plurality of identified placement spaces. Specifically, the information on the at least one may be transmitted from the user terminal to the electronic apparatus 400 based on a user's input to the user terminal, and the processor 420 may receive the information on the at least one. However, the present disclosure is not limited thereto, and the processor 420 may receive the information on or regarding the at least one from a sensor or another device placed in a placement space.

The processor 420 may control the transport device so that the at least one item is transported to a location corresponding to the selected placement space. Meanwhile, the transport device may include, for example, but not limited to a conveyor belt and may include various devices capable of transporting items.

Figure 5:
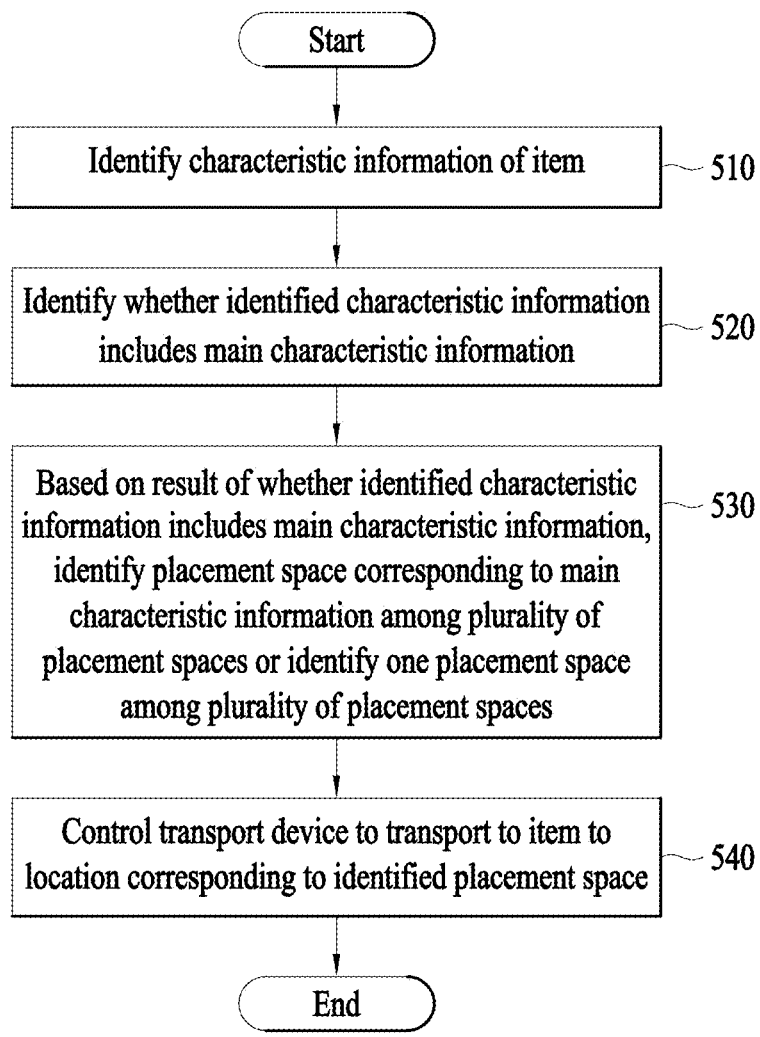
FIG. 5 is a flowchart of an operation method of an electronic apparatus according to an embodiment.

FIG. 5 is a flowchart of an operation method of an electronic apparatus according to an embodiment. Needless to say, operations of the method illustrated in FIG. 5 may be performed in a different order as illustrated in the drawing. In the following description of the drawings, a description identical to the description about FIG. 4 may be omitted.

Referring to FIG. 5, an electronic apparatus may identify characteristic information of an item in operation 510. Here, an item to be transported may be an item recognized by the electronic apparatus or an item recognized by a user terminal. Characteristic information of an item is information representing a characteristic for the corresponding item (or for a type of the corresponding item) and may include main characteristic information and general characteristic information.

The main characteristic information is preset characteristic information and may include, for example, information associated with at least one of a sales rate, a risk of damage, a price, a theft rate, and a loss rate. The main characteristic information may include information on a characteristic which requires planned placement for efficient management since more caution and attention are needed to manage an item. More specifically, the main characteristic information may include information on a characteristic with a sales rate equal to or greater than a particular value, a characteristic with a risk of damage equal to or greater than a particular value, a characteristic with a price equal to or greater than a particular value, a characteristic indicating a theft rate equal to or greater than a particular value, or a characteristic with a loss rate equal to or greater than a particular value.

The general characteristic information is different characteristic information distinguished from the main characteristic information and may include, for example, characteristic information not included in the main characteristic information among a variety of characteristic information. More specifically, the general characteristic information may include information on a characteristic with a sales rate less than a particular value, a characteristic with a risk of damage less than a particular value, a characteristic with a price less than a particular value, a characteristic with a theft rate less than a particular value, or a characteristic with a loss rate less than a particular value.

In operation 520, the electronic apparatus may identify whether the identified characteristic information includes the main characteristic information. More specifically, the electronic apparatus may identify whether the characteristic information of the item corresponds to preset main characteristic information.

In operation 530, based on a result of whether the identified characteristic information includes the main characteristic information, the electronic apparatus may identify a placement space corresponding to the main characteristic information among a plurality of placement spaces or may identify one placement space among the plurality of placement spaces.

Specifically, when the characteristic information of the item includes the main characteristic information, the electronic apparatus may identify the placement space corresponding to the main characteristic information among the plurality of placement spaces. Here, the placement space corresponding to the main characteristic information may be preset to correspond to the main characteristic information.

When the characteristic information of the item does not include the main characteristic information, the electronic apparatus may identify one placement space among the plurality of placement spaces. For example, when the characteristic information of the item does not include the main characteristic information, the electronic apparatus may randomly select one of the plurality of placement spaces. That is, when the characteristic information of the item does not include the main characteristic information, one placement space to which the item is to be placed may be selected, and the selected placement space may be a placement space that has been randomly selected. A method of selecting a placement space based on random stow may be used as a method for the above-described random selection, and this is apparent to one of ordinary skill in the art and thus a detailed description will be herein omitted.

In operation 540, the electronic apparatus may control the transport device so that the item is transported to a location corresponding to the identified placement space. Here, the transport device may include a device connected to the electronic apparatus by a wire or wirelessly and controlled by the electronic apparatus, and may include, for example, a conveyor belt.

The location corresponding to the placement space may include, but not limited to, a specific spot preset relevant to the placement space, and may include at least one spot included in the placement space. The location corresponding to the placement space may be adjacent to at least a portion of the transport device, and accordingly, an item may be transported to the placement space by the transport device.

According to an embodiment, operation 540 may include transmitting a control signal to the transport device so that the item is transported by the transport device. In this case, the transport device may receive the control signal and may perform a control to transport the item based on the received control signal.

Figure 6:
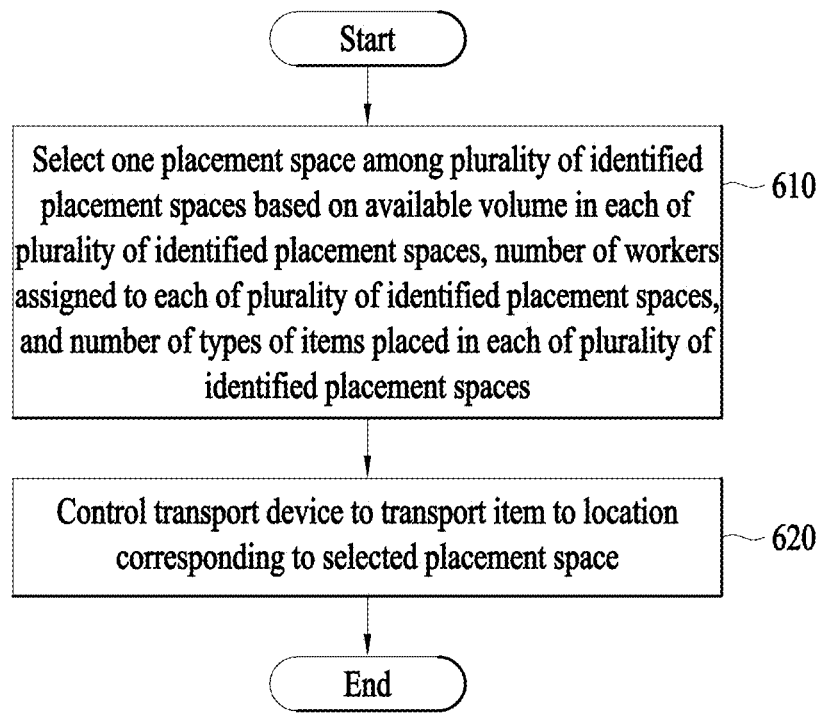
FIG. 6 is a flowchart of an operation method of an electronic apparatus according to another embodiment.

FIG. 6 is a flowchart of an operation method of an electronic apparatus according to another embodiment. Specifically, FIG. 6 is a diagram for describing an example of operation 540 of FIG. 5 in detail.

Referring to FIG. 6, in operation 610, an electronic apparatus may select one placement space among a plurality of identified placement spaces based on at least one of the following: an available volume of each of the plurality of identified placement spaces, a number of workers assigned to each of the plurality of identified placement spaces, and a number of types of items placed in each of the plurality of identified placement spaces.

More specifically, the electronic apparatus may identify whether a plurality of placement spaces is identified. If the plurality of placement spaces is identified, the electronic apparatus may select one placement space among the plurality of identified placement spaces based on at least one of the following: an available volume of each of the plurality of identified placement spaces, a number of assigned workers of each of the plurality of identified placement spaces, and a number of types of items placed in each of the plurality of identified placement spaces.

For example, when a plurality of placement spaces is identified, the electronic apparatus may select a placement space with a largest available volume among the plurality of identified placement spaces as a placement space to which the item is to be transported. In another example, when the plurality of identified placement spaces is in plural, the electronic apparatus may select a placement space with a largest number of assigned workers among the plurality of identified placement spaces as a placement space to which the item is to be transported. In yet another example, when the plurality of identified placement spaces is in plural, the electronic apparatus may select a placement space with items of a smallest number of types among the plurality of identified placement spaces as a placement space to which the item is to be transported.

In operation 620, the electronic apparatus may control the transport device so that the item is transported to a location corresponding to the selected placement space. The location corresponding to the placement space may include, but not limited to, a preset location within the placement space or a particular spot existing within a preset distance from the placement space.

In an embodiment, the electronic apparatus may generate a control signal for controlling the transport device to move the item to the selected placement space in response to the selection of the placement space, and may transmit the generated control signal to the transport device. The transport device may transport the item to the location corresponding to the selected placement space in response to reception of the control signal.

Figure 7:
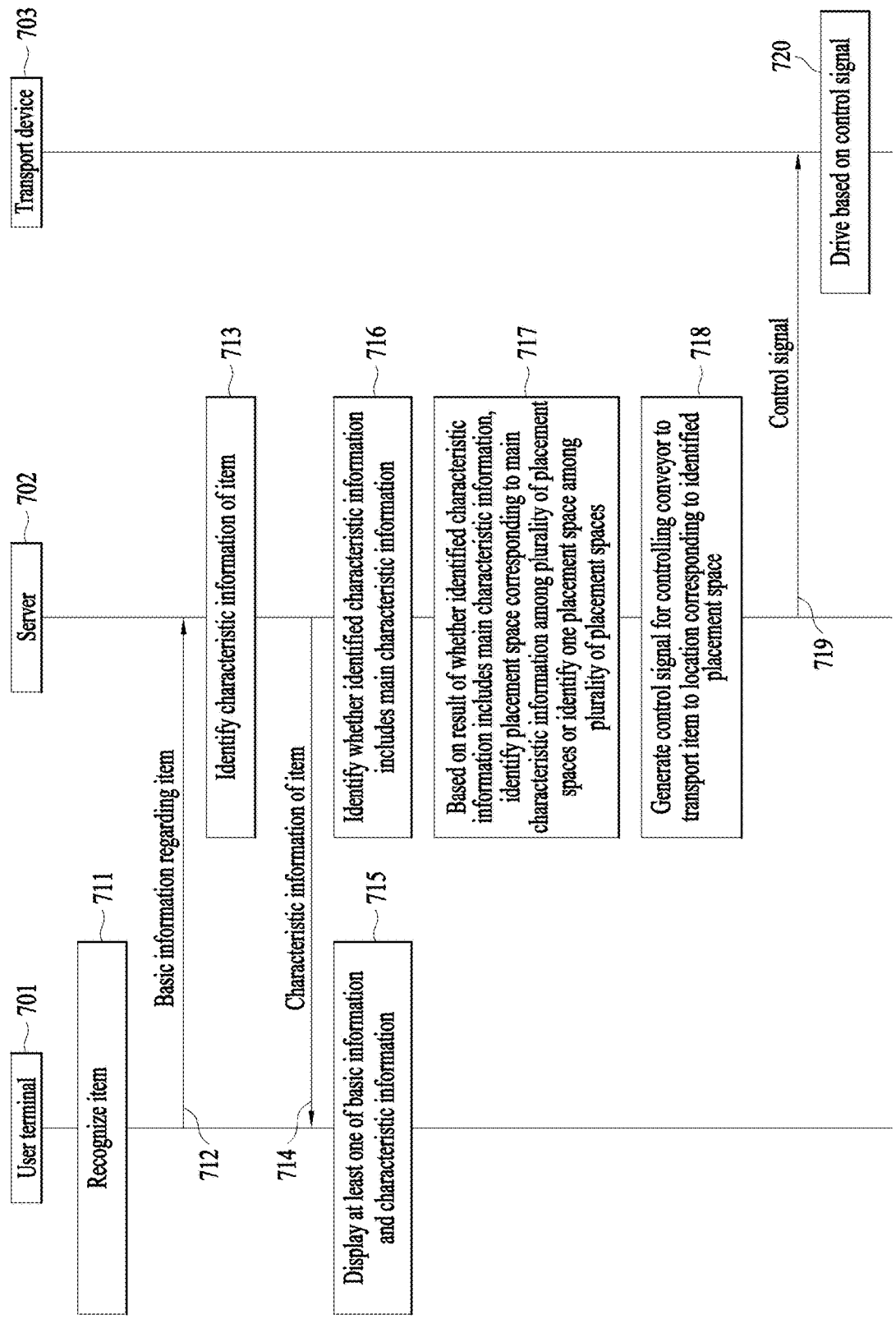
FIG. 7 is a flowchart illustrating signals between an electronic apparatus and other electronic apparatuses according to an embodiment.

FIG. 7 is a flowchart illustrating signals between an electronic apparatus and other electronic apparatuses according to an embodiment. FIG. 7 illustrates an embodiment in which an electronic apparatus is implemented as a server 702, but the present disclosure is not limited to the example. In addition, other electronic apparatuses connected to an electronic apparatus in FIG. 7 may include a user terminal 701 and a transport device 703.

Referring to FIG. 7, the user terminal 701 may recognize an item in operation 711. Specifically, the user terminal 701 may recognize the item using a sensor included in (or connected to) the user terminal 701. For example, the user terminal 701 may recognize the item by recognizing a barcode included in the item using the sensor. Meanwhile, the sensor may include, but not limited to, an image sensor that recognizes an image.

The user terminal 701 may acquire basic information of the item in response to the recognition of the item. The basic information of the item is general information describing the item, and may include, for example, but not limited to, at least one of an item name, an item type, and a serial number assigned to the item.

In operation 712, the user terminal 701 may transmit the basic information of the item to the server 702. In operation 713, the server 702 may identify characteristic information of the item based on the basic information of the item. Characteristic information may be preset for each item, and may include, for example, main characteristic information requiring planned placement or general characteristic information requiring random placement.

Here, the planned placement may refer to a type of placement by which a particular item is placed in a particular location based on a fixed stow method. The random placement may refer to a type of placement by which an item is randomly placed at an arbitrary location based on a random stow method.

The main characteristic information may be information representing a characteristic which requires an item to be placed in a placement space that is matched to a type of the main characteristic information. For example, the main characteristic information may include information associated with at least one of a sales rate, a risk of damage, a price, a theft rate, and a loss rate, and a detailed description thereof has been already described and thus it will be herein omitted.

The general characteristic information is characteristic information distinguished from (different from or opposite to) the main characteristic information and may represent a characteristic which requires an item to be placed in a placement space that is randomly selected from among a plurality of placement spaces.

For example, when the main characteristic information is information on a characteristic with a sales rate equal to or greater than a particular value, the general characteristic information may include information distinguished from the main characteristic information, that is, information on a characteristic with a sale rate less than the particular value.

Based on identifying of the characteristic information of the item, the server 702 may transmit the characteristic information of the item to the user terminal 701 in operation 714. In some cases, the order of operation 714 is not limited to that shown in FIG. 7, and operation 714 may be performed regardless of the order of operations 716 to 720.

In operation 715, the user terminal 701 may display at least one of the basic information and the characteristic information. For example, the user terminal 701 may display the basic information and the characteristic information of the item together.

In an embodiment, a placement space may be preset for each characteristic information of an item. In this case, when the characteristic information is displayed on the user terminal 701, the user may be able to infer a placement space, and therefore, item management may be implemented more smoothly. In some cases, information on a placement space for each characteristic information may be stored in the user terminal 701. In this case, the user terminal 701 may provide information on the placement space associated with the characteristic information, in addition with the characteristic information.

In operation 716, the server 702 may identify whether the identified characteristic information includes main characteristic information.

In operation 717, based on a result of whether the identified characteristic information includes the main characteristic information, the server 702 may identify a placement space corresponding to the main characteristic information among the plurality of placement spaces or may identify one placement space among the plurality of placement spaces.

Specifically, when the characteristic information of the item includes the main characteristic information, the server 702 may identify the placement space corresponding to the main characteristic information among the plurality of placement spaces, and when the identified characteristic information does not include the main characteristic information, the server 702 may randomly identify one placement space among the plurality of placement spaces.

Although not illustrated, according to an embodiment, the server 702 may transmit information on the identified placement space to the user terminal 701 according to an embodiment. In this case, the user terminal 701 may display information on the placement space.

In operation 718, the server 702 may generate a control signal for controlling the transport device 703 so that the item is transported to a location corresponding to the identified placement space. The transport device 703 is a device connected to the server 702 by a wire or wirelessly and transporting the item to a specific spot, and may include, for example, a conveyor belt.

In operation 719, the server 702 may transmit a control signal to the transport device 703. In operation 720, the transport device 703 may be driven based on the received control signal and transport the item to the location corresponding to the identified placement space.

FIG. 8 is a diagram illustrating a user interface (UI) provided in an electronic apparatus to set characteristic information of an item, according to an embodiment. Specifically, FIG. 8 shows a UI provided to set characteristic information for each of a plurality of items allowed (or expected) to be placed.

Referring to FIG. 8, a characteristic of Item A 810 may be set to HighRisk, and this may also apply to Items B and C. Here, each of Item A, Item B, and Item C represents a name of a different item, that is, a different item name. The HighRisk is a term indicating first main characteristic information and may be expressed as various terms according to an embodiment.

Although only three item names are illustrated in FIG. 8, the present disclosure is not limited thereto, and names of various items allowed to be placed in a placement space may be used. Characteristic information may be set for each item through a UI as shown in FIG. 8 before a corresponding item is received. Characteristic information may be set for each item name based on a user input to a characteristic setting area 820.

For example, at least one of a plurality of main characteristic information and a name of general characteristic information (e.g., HighRisk, Prime 1, and General) may be displayed based on a click of an arrow included in the characteristic setting area 820. In this case, characteristic information of an item may be set based on an input of selecting one of the displayed main characteristic information or the displayed general characteristic information and an input to a storage icon.

Meanwhile, the names of the main characteristic information and the general characteristic information may be expressed as various terms according to an embodiment, and the present disclosure is not limited thereto.

According to an embodiment, there may be a plurality of fulfillment centers, and items to be received may be preset for each of the plurality of fulfillment centers. In this case, characteristic information for each item may be set in unit of a fulfillment center. For example, as illustrated in FIG. 8, characteristic information for each item may be set for a fulfillment center "DEO 1."

In an embodiment, the UI illustrated in FIG. 8 may be provided to another electronic apparatus connected to the electronic apparatus. For example, in an embodiment of the present disclosure, the UI may be provided to, but not limited to, a user terminal (e.g., the user terminal 210 of FIG. 2), and may be provided through a display connected to the electronic apparatus.

In an embodiment, the UI as shown in FIG. 8 may be provided based on an input to a field "Prim SKU management" of a menu item "Stock management" on the top bar, but the present disclosure is not limited thereto.

FIG. 9 is a diagram illustrating a UI provided in an electronic apparatus to set a placement space according to an embodiment. Specifically, FIG. 9 shows an example of setting characteristic information for each of a plurality of placement spaces.

Referring to FIG. 9, information on characteristics of each of the plurality of placement spaces may be displayed. For example, as shown, characteristic information of a placement space "30Z" may be set to "General", characteristic information of a placement space "21Z" may be set to "Highrisk", and characteristic information of a placement space "11Z" may be set to "Prime 1." Here, "General" may correspond to general characteristic information, "Highrisk" may correspond to first main characteristic information, and "Prime 1" may correspond to second main characteristic information.

A characteristic of each placement space may be set or changed based on a user input to a characteristic setting area 910. For example, the name of at least one of a plurality of main characteristic information or the name of the general characteristic information (e.g., Highrisk, Prime 1, and General) may be displayed based on a click of an arrow included in the characteristic setting area 910. In this case, characteristic information of an item may be set based on an input of selecting one of the displayed main characteristic information or the displayed general characteristic information and an input to a storage icon.

In an embodiment, a characteristic of each placement space may be set in unit of a fulfillment center. For example, as illustrated in FIG. 9, characteristic information for each placement space may be set for a fulfillment center "DEO 1."

In an embodiment, the UI illustrated in FIG. 9 may be provided to another electronic apparatus connected to the electronic apparatus. For example, in an embodiment of the present disclosure, the UI may be provided to, but not limited to, a user terminal (e.g., the user terminal 210 of FIG. 2), and may be provided through a display connected to the electronic apparatus.

In an embodiment, when characteristic information of each item or each placement space is set as shown in FIGS. 8 and 9, an item having a corresponding characteristic may be matched to a placement space having the corresponding characteristic, and the electronic apparatus may be able to identify a placement space to which the item is to be transported. For example, the electronic apparatus may identify the placement space that is matched to the item as a placement space to which the item is to be transported.

In an embodiment, the UI as shown in FIG. 9 may be provided based on an input to a field "Placement space management" of a menu item "Location" on the top bar, but the present disclosure is not limited thereto.

FIGS. 10 and 11 are diagrams illustrating UIs provided by an electronic apparatus to set a receipt filter according to an embodiment. Specifically, FIGS. 10 and 11 illustrate a UI where a receipt filter is added to manage items by distinguishing each item corresponding to main characteristic information from the receiving step, and where criterion for the receipt filter can be set.

Referring to FIG. 10, an electronic apparatus may provide a UI that shows information on or regarding a pre-generated receipt filter. According to FIG. 10, the information on the receipt filter may include information on a receipt filter name, a placement space type, a subject item, and a transport device.

For example, information on or regarding the receipt filter name may include information on a name of a receipt filter preset by a user, and information on the placement space type may include information on a type preset relevant to the purpose of a placement space. Information on the subject item is information on the item to which the receipt filter is applied, and may include characteristic information of the item. Information on the transport device may include information on an identification number affixed to at least a part of the transport device.

According to an embodiment, a class may be assigned to an item, and in this case, the information on or regarding the subject item may include information on or regarding the class of the item. In addition, in some cases, information on a size of the item may be included.

In an embodiment, the information on or regarding the receipt filter may further include information on or regarding a priority for the receipt filter. The information on the priority may indicate, but not limited to, a priority by which an item to be classified by the receipt filter is to be distinguished and may indicate various types of priority by which an item is to be classified.

In an embodiment, in response to recognition of an item, the electronic apparatus may identify a receipt filter corresponding to the item based on basic information and characteristic information of the item. When a plurality of items is recognized, the electronic apparatus may identify a receipt filter for each of the plurality of items based on basic information and characteristic information for each of the plurality of items. In this case, the electronic apparatus may distinguish and manage a plurality of items corresponding to the same receipt filter. For example, items corresponding to the same receipt filter may be gathered in one tote (or box) and then transported together.

Referring to FIG. 10, the electronic apparatus may provide a field "Add new receipt filter" 1010 and may display a UI as shown in FIG. 11 to add a new receipt filter based on a user input to the field 1010.

Referring to FIG. 11, in order to add a new receipt filter, an electronic apparatus may provide a basic information area 1110 and a to-be-applied field area 1120 of the receipt filter to be added. Each of the basic information area 1110 and the to-be-applied field area 1120 may include various fields related to the receipt filter, and the fields may be added or omitted according to an embodiment.

The receipt filter may be added based on a user input to the basic information area 1110 and the to-be-applied field area 1120. As an example, upon receiving an input to a field "Prime SKU", P1(PRIME_1), P2(PRIME_2), P3(PRIME_3), P4(PRIME_4), P5(PRIME_5), and H(PRIME_HIGH_RISK) appear as illustrated, and upon receiving an input of selecting one of P1(PRIME_1), P2(PRIME_2), P3(PRIME_3), P4(PRIME_4), P5(PRIME_5), and H(PRIME_HIGH_RISK), characteristic information of an item related to the receipt filter which is to be added may be determined based on the received input.

Meanwhile, the UI illustrated in FIGS. 10 and 11 may be provided through, but not limited to, a display connected to the electronic apparatus and may be provided through a user terminal (e.g., the user terminal 210 of FIG. 2).

Figure 12:
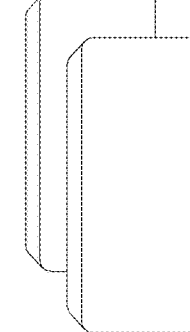

FIGS. 12 and 13 are diagrams illustrating UIs provided by an electronic apparatus in response to recognition of an item, according to an embodiment.

FIG. 12 illustrates an example of a screen provided through a display connected to an electronic apparatus or a user terminal in response to recognition of an item. Specifically, FIG. 12 illustrates an example of a screen on which identified characteristic information of an item is displayed based on identification of the characteristic information of the item. The characteristic information of the item may be displayed as an icon 1210, which may appear in a different form for each characteristic information.

According to an embodiment, a position or shape of the icon 1210 may be implemented in various ways and is not limited to the present embodiment.

Referring to FIG. 12, basic information of the item may be further displayed in addition to the icon 1210 associated with the characteristic information. For example, a fulfillment center name, a work table related to the item, a tracking number, an item serial number, an item name, a manufacturing date, an expiration date, a production date, and a received quantity may be displayed. In addition, in some cases, information on a "tote destination" may be displayed as a location corresponding to a placement space to which the item is to be placed in response to identification of a placement space for the item, but the present disclosure is not limited thereto.

FIG. 13 illustrates a screen displaying information on each of a plurality of items when the plurality of items are recognized. Even in this case, as in FIG. 12, characteristic information of an item may be displayed in the form of an icon 1310. According to each characteristic information, a different icon representing corresponding characteristic information may be displayed. When characteristic information of an item is associated with general characteristic information, an icon may not be displayed as illustrated, but the present disclosure is not limited thereto.

Figure 14:
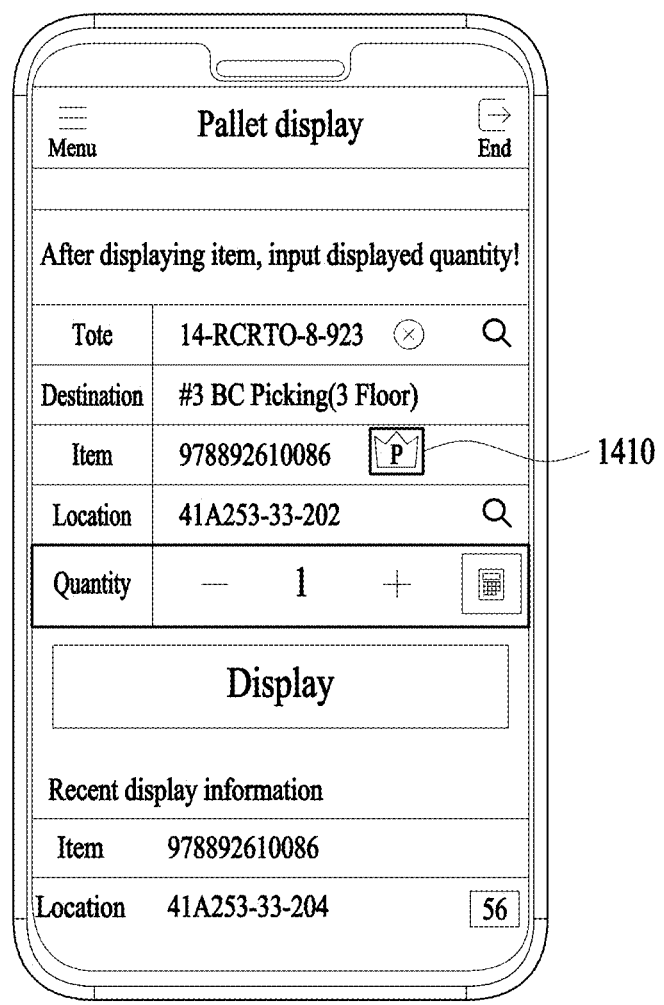
FIGS. 14 and 15 are diagrams illustrating UIs displayed on a user terminal connected to an electronic apparatus according to an embodiment.
Figure 15:
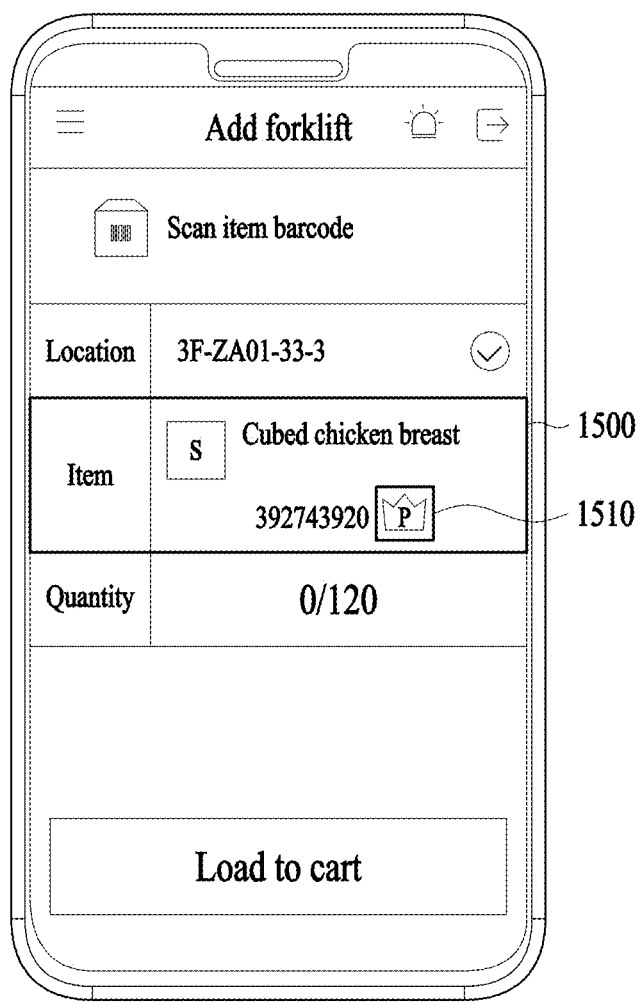

FIGS. 14 and 15 are views illustrating a UI displayed on a user terminal connected to an electronic apparatus according to an embodiment.

In an embodiment, FIG. 14 shows an example of a screen displayed on a user terminal to allow an item to be placed in a placement space by a user after the item is transported to a location corresponding to the placement space by a transport device. Specifically, FIG. 14 may include a screen displayed on the user terminal to induce placement of an item and acquire information associated with the placement of the item when the item placed at a location corresponding to the placement space is recognized using the user terminal.

According to FIG. 14, an icon 1410 corresponding to characteristic information of an item may be displayed. An icon may differ for each characteristic information of the item, and based on the icon 1410, a user of the user terminal may be able to know what kind of characteristic information the item has. In addition, the placement space may be preset for each characteristic information, and thus the placement space may be reminded once again, thereby preventing a placement error.

When the placement of the item is completed, information related to the placement of the item may be transmitted from the user terminal to the electronic apparatus based on an input regarding a quantity of the placed item and an input to a display button.

FIG. 15 illustrates a screen displayed on a user terminal in response to a user terminal recognizing an item to be transported through a forklift when the forklift is included as a transport device. Referring to FIG. 15, an icon 1510 representing characteristic information of an item may be displayed on at least a portion of an area 1500 associated with the item.

In an embodiment, information on the icon 1510 representing the characteristic information of the item may be stored in advance in the user terminal. In this case, in response to receiving the characteristic information of the item from an electronic apparatus, a screen including the icon 1510 may be provided as illustrated in FIG. 15. However, the present disclosure is not limited thereto, and the information on the icon 1510 and information on the screen may be received from the electronic apparatus.

According to the present disclosure, an electronic apparatus for transporting an item and an operation method thereof may cause an item to be transported to a placement space confirmed based on characteristic information of the item, thereby enabling item management more effectively. For example, the electronic apparatus and the operation method thereof may cause an item having first characteristic information (e.g., main characteristic information) to be transported to a placement space matched to the first characteristic information and an item having second characteristic information (e.g., general characteristic information) to be randomly placed, thereby enabling item management more effectively and improving operation efficiency.

In addition, when there is a plurality of placement spaces corresponding to characteristic information of an item, the electronic apparatus and the operation method thereof may determine, based on characteristics of the placement spaces, a placement space where an item is to be transported, thereby enabling item management to be performed more effectively. For example, when a placement space corresponding characteristic information of an item includes a first placement space and a second placement space, the electronic and the operation method thereof may cause the item to be placed in a placement space having a larger number of workers, thereby enabling item management more efficiently.

The apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described embodiments are merely examples, and other embodiments may be implemented within the scope of the following claims.

What is claimed is:

1. A method operable by an electronic apparatus for transporting an item, the method comprising:
 identifying characteristic information of the item;
 determining whether the characteristic information of the item comprises main characteristic information associated with planned placement or general characteristic information associated with random placement;
 based on a result of the determining of whether the characteristic information of the item comprises the main characteristic information or the general characteristic information, identifying a placement space as a first placement space corresponding to the main characteristic information from a plurality of placement spaces or as a second placement space from the plurality of placement spaces; and
 controlling a transport device to transport the item to a location corresponding to the placement space,
 wherein the identifying of the placement space comprises:
  in response to determining the characteristic information comprises the main characteristic information, identifying the first placement space corresponding to the main characteristic information from the plurality of placement spaces; and
  in response to determining the characteristic information comprises the general characteristic information, randomly identifying the second placement space from the plurality of placement spaces,
 wherein the main characteristic information of the item comprises a first characteristic with a theft rate equal to or greater than a first value or a second characteristic with a loss rate equal to or greater than a second value, wherein the theft rate and the loss rate are predetermined to correspond to a type of the item based on an input of a user,
 wherein the identifying of the characteristic information of the item comprises:
  identifying, based on the type of the item, a particular theft rate and a particular loss rate corresponding to the type of the item,
 wherein the determining of whether the characteristic information of the item comprises the main characteristic information further comprises:
  identifying whether the particular theft rate is equal to or greater than the first value or the particular loss rate is equal to or greater than the second value,
 wherein the identifying of the placement space further comprises:
  identifying the placement space to which the item is to be transported within a predetermined distance from a preset location,
 wherein the preset location comprises a specific spot within an area of a security camera,
 wherein the controlling of the transport device comprises:
  in response to detecting more than one placement space corresponds to the main characteristic information, identifying a number of types of items preplaced in each of the more than one placement space; and
  selecting the placement space from the more than one placement space corresponding to the main characteristic information based on the number of types of items, the placement space having a smallest number of types of preplaced items among the more than one placement space.

2. The method of claim 1, wherein the identifying of the characteristic information of the item further comprises:
 acquiring basic information of the item from a user terminal; and
 based on the basic information, identifying the characteristic information of the item,
 wherein the basic information of the item comprises information regarding at least one of an item name, a type of the item, or a serial number assigned to the item.

3. The method of claim 2, further comprising transmitting the characteristic information to the user terminal, wherein the characteristic information is displayed on the user terminal.

4. The method of claim 1, wherein the controlling of the transport device further comprises:
 in response to detecting the more than one placement space corresponds to the main characteristic information, selecting the placement space from the more than one placement space further based on information regarding at least one of an available volume in each of the more than one placement space or a number of workers assigned to each of the more than one placement space; and
 controlling the transport device to transport the item to the location corresponding to the placement space.

5. The method of claim 4, wherein the selecting of the placement space from the more than one placement space comprises:
 based on selecting the placement space from the more than one placement space based on information regarding the available volume in each of the more than one placement space, identifying the information regarding the available volume in each of the more than one placement space; and
 selecting the placement space, the placement space having a largest available volume among the more than one placement space.

6. The method of claim 4, wherein the selecting of the placement space comprises:
 based on selecting the placement space from the more than one placement space based on information regarding the number of workers assigned to each of the more than one placement space, identifying the information regarding the number of workers assigned to each of the more than one placement space; and
 selecting the placement space, the placement space having a largest number of assigned workers among the more than one placement space.

7. The method of claim 4, wherein the information regarding the at least one of the available volume in each of the more than one placement space or the number of workers assigned to each of the more than one placement space is received from a user terminal.

8. The method of claim 1,
wherein each of the plurality of placement spaces comprises a predetermined space to place the item therein; and
wherein the main characteristic information further comprises a third characteristic regarding at least one of a sales rate, a risk of damage, a price, a theft rate, and a loss rate.

9. The method of claim 1, wherein the main characteristic information further comprises a third characteristic with a sales rate equal to or greater than a third value, the first placement space corresponding to the main characteristic information within a predetermined distance from a shipping location.

10. The method of claim 1, wherein when the main characteristic information further comprises a third characteristic with a risk of damage equal to or greater than a third value, the first placement space corresponding to the main characteristic information within a predetermined distance from a receiving location or a shipping location.

11. The method of claim 1, wherein the first placement space corresponding to the main characteristic information is predetermined based on the input of the user.

12. The method of claim 1, further comprising transmitting information regarding the placement space to a user terminal.

13. The method of claim 1, wherein the transport device comprises a conveyor connected to the electronic apparatus.

14. An electronic apparatus for transporting an item, the apparatus comprising:
a memory storing at least one instruction, and
a processor configured to execute the stored at least one instruction to:
identify characteristic information of the item,
determine whether the characteristic information comprises main characteristic information associated with planned placement or general characteristic information associated with random placement,
based on a result of the determining of whether the characteristic information of the item comprises the main characteristic information or the general characteristic information, identify a placement space as a first placement space corresponding to the main characteristic information from a plurality of placement spaces or as a second placement space from the plurality of placement spaces, and
control a transport device to transport the item to a location corresponding to the placement space,
wherein the processor is further configured to:
in response to determining the characteristic information comprises the main characteristic information, identify the first placement space corresponding to the main characteristic information from the plurality of placement spaces; and
in response to determining the characteristic information comprises the general characteristic information, randomly identify the second placement space from the plurality of placement spaces,
wherein the main characteristic information comprises a first characteristic with a theft rate equal to or greater than a first value or a second characteristic with a loss rate equal to or greater than a second value, wherein the theft rate and the loss rate are predetermined to correspond to a type of the item based on an input of a user,
wherein the processor is further configured to:
identify, based on an identification of the type of the item, a particular theft rate and a particular loss rate corresponding to the type of the item,
identify whether the particular theft rate is equal to or greater than the first value or the particular loss rate is equal to or greater than the second value,
identify the placement space to which the item is to be transported within a predetermined distance from a preset location,
in response to detecting more than one placement space corresponds to the main characteristic information, identify a number of types of items preplaced in each of the more than one placement space; and
select, based on the number of types of items, the placement space from the more than one placement space corresponding to the main characteristic information, the placement space having a smallest number of types of preplaced items among the more than one placement space,
wherein the preset location comprises a specific spot within an area of a security camera.

15. A non-transitory computer-readable program having stored thereon a program, which, when executed, cause an electronic apparatus to transport an item, wherein execution of the program causes the electronic apparatus to:
identify characteristic information of the item;
determine whether the characteristic information of the item comprises main characteristic information associated with planned placement or general characteristic information associated with random placement;
based on a result of determining whether the characteristic information of the item comprises the main characteristic information or the general characteristic information, identify a placement space as a first placement space corresponding to the main characteristic information from a plurality of placement spaces or as a second placement space from the plurality of placement spaces; and
control a transport device to transport the item to a location corresponding to the placement space,
wherein to identify the placement space, the execution of the program further causes the electronic apparatus to:
in response to determining the characteristic information comprises the main characteristic information, identify the first placement space corresponding to the main characteristic information from the plurality of placement spaces; and
in response to determining the characteristic information comprises the general characteristic information, randomly identify the second placement space from the plurality of placement spaces,
wherein the main characteristic information of the item comprises a first characteristic with a theft rate equal to or greater than a first value or a second characteristic with a loss rate equal to or greater than a second value,
wherein the theft rate and the loss rate are predetermined to correspond to a type of the item based on an input of a user,
wherein to identify the characteristic information of the item, the execution of the program further causes the electronic apparatus to:
identify, based on the type of the item, a particular theft rate and a particular loss rate corresponding to the type of the item,
wherein to determine whether the characteristic information of the item comprises the main characteristic information, the execution of the program further causes the electronic apparatus to:
identify whether the particular theft rate is equal to or greater than the first value or the particular loss rate is equal to or greater than the second value, wherein to identify the placement space, the execution of the program further causes the electronic apparatus to:
identify the placement space to which the item is to be transported within a predetermined distance from a preset location, wherein the preset location comprises a specific spot within an area of a security camera, wherein to control the transport device, the execution of the program further causes the electronic apparatus to:
in response to detecting more than one placement space corresponds to the main characteristic information, identify a number of types of items preplaced in each of the more than one placement space; and
select the placement space from the more than one placement space corresponding to the main characteristic information based on the number of types of items, the placement space having a smallest number of types of preplaced items among the more than one placement space.

* * * * *